United States Patent
Junker et al.

(10) Patent No.: US 7,079,855 B1
(45) Date of Patent: Jul. 18, 2006

(54) METHOD FOR OPERATING A GSM MOBILE RADIO SYSTEM

(75) Inventors: Heiko Junker, Munich (DE); Holger Kunze, Munich (DE); Norbert Loechel, Munich (DE); Andreas Senft, Starnberg (DE)

(73) Assignee: Siemens Aktiengesellschaft, Munich (DE)

( * ) Notice: Subject to any disclaimer, the term of this patent is extended or adjusted under 35 U.S.C. 154(b) by 421 days.

(21) Appl. No.: 10/130,702

(22) PCT Filed: Nov. 21, 2000

(86) PCT No.: PCT/DE00/04096

§ 371 (c)(1),
(2), (4) Date: May 22, 2002

(87) PCT Pub. No.: WO01/39390

PCT Pub. Date: May 31, 2001

(30) Foreign Application Priority Data

Nov. 22, 1999 (DE) ................................ 199 56 094

(51) Int. Cl.
*H04B 7/01* (2006.01)

(52) U.S. Cl. ................. 455/502; 455/509; 455/426.1; 455/422.1; 455/443; 455/450; 455/456.2; 370/328; 370/338

(58) Field of Classification Search ............ 455/426.1, 455/12.1, 422.1, 450, 456.2, 443, 436, 502, 455/509; 370/515, 519, 328–338; 445/443
See application file for complete search history.

(56) References Cited

U.S. PATENT DOCUMENTS

| | | | |
|---|---|---|---|
| 5,319,374 A * | 6/1994 | Desai et al. ................. 342/387 |
| 5,586,119 A * | 12/1996 | Scribano et al. ............ 370/350 |
| 5,844,894 A * | 12/1998 | Dent ........................... 370/330 |
| 5,870,001 A | 2/1999 | Österling et al. |
| 5,884,181 A * | 3/1999 | Arnold et al. ............... 455/450 |
| 6,008,740 A * | 12/1999 | Hopkins ...................... 340/905 |
| 6,157,845 A * | 12/2000 | Henry et al. ............. 455/426.1 |
| 6,324,406 B1 * | 11/2001 | Zadeh ...................... 455/456.2 |
| 6,381,226 B1 * | 4/2002 | Choi .......................... 370/316 |
| 6,385,198 B1 * | 5/2002 | Ofek et al. .................. 370/389 |
| 6,466,785 B1 * | 10/2002 | Chambert et al. ........ 455/422.1 |
| 6,516,007 B1 * | 2/2003 | Hong et al. ................. 370/515 |
| 2004/0087270 A1 * | 5/2004 | Krasner ..................... 455/12.1 |

FOREIGN PATENT DOCUMENTS

DE 28 12 774 A1 9/1979

OTHER PUBLICATIONS

XP-000831517 "The Evolution of IS-136 TDMA for Third-Generation Wireless Services." c. Jun. 1999.

* cited by examiner

*Primary Examiner*—George Eng
*Assistant Examiner*—Khai Nguyen
(74) *Attorney, Agent, or Firm*—Morrison & Foerster LLP

(57) ABSTRACT

The invention relates to a method for operating a GSM mobile radio system, according to which at least one transmitter, which is allocated to a reference time generator, emits a signal including information concerning a reference time. The signal including the aforementioned information is received by the base stations. Each base station then synchronizes time slots of communications channels with reference to the reference time, said channels being made available via a radio interface between each respective base station and its allocated subscriber station.

15 Claims, 1 Drawing Sheet

METHOD FOR OPERATING A GSM MOBILE RADIO SYSTEM

CLAIM FOR PRIORITY

This application claims priority to International Application No. PCT/DE00/04096 which was published in the German language on May 31, 2001.

TECHNICAL FIELD OF THE INVENTION

The invention relates to a method for operating a GSM mobile radio system.

BACKGROUND OF THE INVENTION

GSM mobile radio systems allow communications connections to be set up to mobile subscribers by transmitting information by means of electromagnetic waves via a radio interface between a transmitting and a receiving radio station. In GSM mobile radio systems, electromagnetic waves are emitted with carrier frequencies in the 900 MHz, 1800 MHz and 1900 MHz ranges. To distinguish between different signal sources at the location of the relevant receiver, a combination of frequency and time division multiplex methods is used. An important function is performed by base stations, which maintain the radio links within one or more cells with one or more subscriber stations. Connection-oriented and packet-oriented concepts can be used in order to transmit data. In connection-oriented data transmission, physical resources must be made available between the participants in the communication throughout the entire period. In contrast to this, in packet-oriented data transmission, physical resources need to be made available only during the actual transmission times. This method is based on the concept whereby the data are transmitted in short data packets, between which longer pauses may occur. The physical resources are available to other logical connections in the pauses between the data packets.

GSM mobile radio systems were originally designed to transmit voice, whereby one channel is reserved for continuous information transmission between the subscriber stations and the base station. However, in packet-oriented data transmission, one common channel is used for a plurality of subscriber stations for packet data transmission.

In some countries, for example the USA, numerous frequency bands are already used by GSM mobile radio systems for connection-oriented services and are therefore not available for packet-oriented data services, the implementation of which requires greater bandwidth. When setting up overlaid cellular radio networks for packet-oriented data transmission, which are known by the name of EDGE (Enhanced Data Rates for GSM Evolution), certain carrier frequencies previously used by connection-oriented services are released for the overlaid radio networks. However, despite such measures, relatively few carrier frequencies are available to the overlaid radio networks. This results in a narrow repetition pattern of the carrier frequencies for the overlaid cellular radio networks, creating the risk of increased common channel interference.

SUMMARY OF THE INVENTION

The present invention indicates a method which enables reliable operation of an overlaid radio network for packet-oriented data transmission, even when a small number of carrier frequencies is available for this purpose.

In one embodiment, an overlaid cellular radio network for packet-oriented data transmission which is in the process of being set up is not globally available from the outset. From experience, a radio network is initially set up in isolated areas. Furthermore, equipment from different manufacturers is often used. During the set-up of the overlaid cellular radio network for packet-oriented data transmission, the individual isolated areas which provide radio network coverage grow into one another and merge with one another. Synchronized operation of the base stations occurs at the transition points. Along with the operational aspects, the outlined defining conditions for the set-up of an overlaid radio network for packet-oriented data transmission should be fully taken into account. Furthermore, synchronized operation of base stations has hitherto been totally absent from GSM mobile radio stations.

According to another embodiment of the invention, the signal including information concerning the reference time is emitted by a GPS satellite (Global Positioning System). To do this, each base station has a GPS receiver. When the Global Positioning System is used, the reference time is available in the form of the UTC (Universal Time Coordinated).

According to still another embodiment of the invention, the signal containing information concerning the reference time is emitted by a time signal transmitter, which is allocated to an atomic clock. An example of a time signal transmitter of this type is the DCF77 transmitter operated in the Federal Republic of Germany by the "Physikalisch-technische Bundesanstalt" [Federal Institute of Physics and Metrology]. The information concerning the clock time included in the DCF77 time signal is determined by two high-precision primary cesium atomic clocks. The time difference between the two atomic clocks, extrapolated to 1,000,000 years, is a maximum of one second. Transit time differences during transmission of the time signal from the transmitter to the receiver are compensated by a correction value calculated for the base station concerned.

According to yet another embodiment of the invention, during transmission via a control channel provided for packet-oriented services within a predefined radio cell, data are not transmitted in the adjacent radio cells via channels which use the same carrier frequencies as the control channel provided for packet-oriented services. Adequate separation of the control channels is thus achieved.

BRIEF DESCRIPTION OF THE DRAWINGS

The invention is explained in detail below with reference to embodiments and to the drawing, in which.

DETAILED DESCRIPTION OF THE PREFERRED EMBODIMENTS

Figure 1:
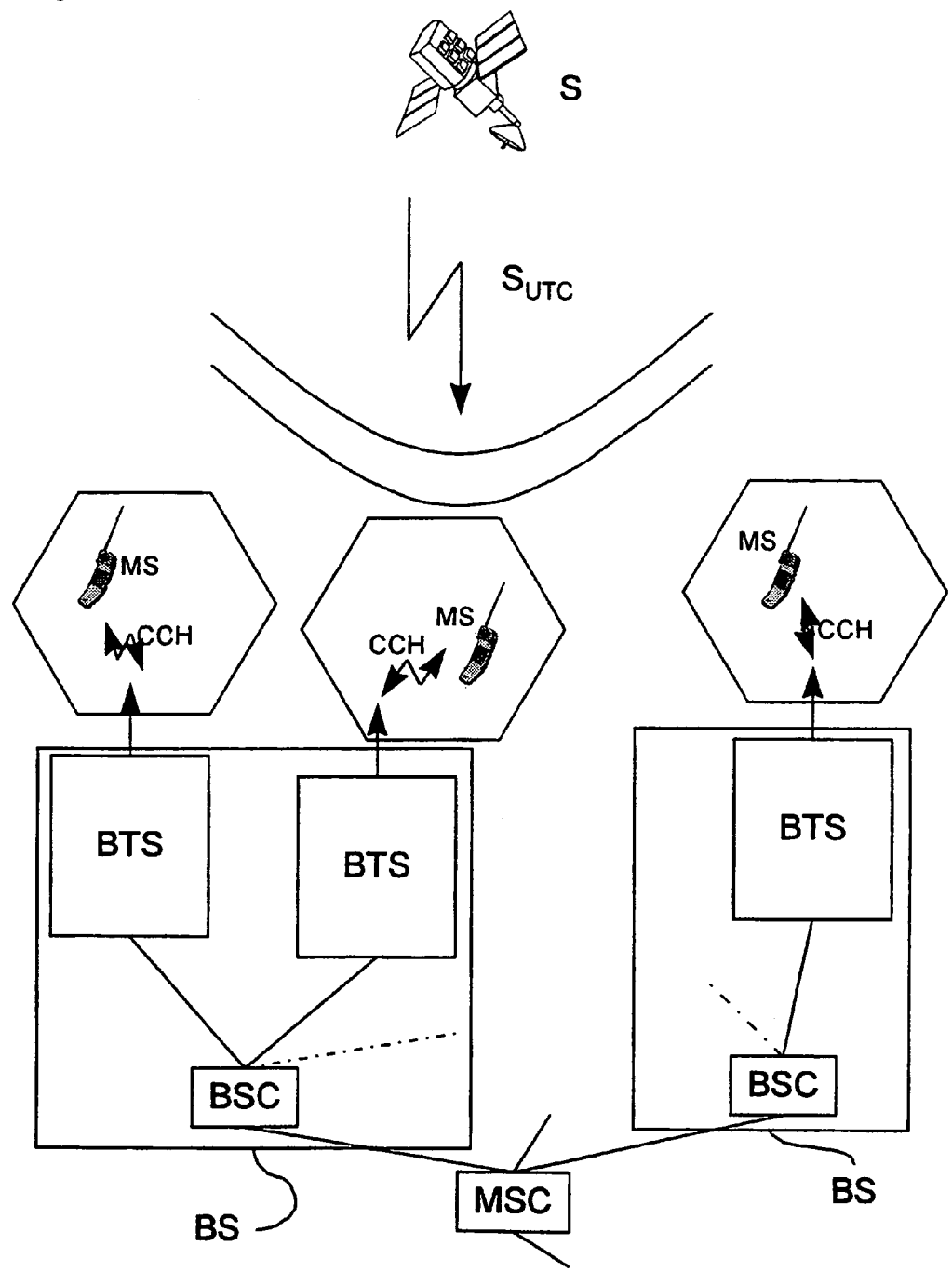
FIG. 1 shows a schematic representation of an arrangement with a plurality of base stations of a GSM mobile radio system and with a transmitter emitting information concerning a reference time.

FIG. 1 shows a transmitter S, which is allocated to a reference time generator which is not shown in detail. In the present embodiment, the transmitter S is allocated to a satellite of the Global Positioning System and transmits a signal $S_{UTC}$ including information concerning a reference time to base stations BS of a GSM mobile radio system which are to be synchronized and by means of which radio channels CCH are made available for packet-oriented services. In the Global Positioning System, the signal $S_{UTC}$ includes information concerning the UTC (Universal Time Coordinated).

The signal $S_{UTC}$ containing information concerning the reference time is received by base transceiver stations BTS which are allocated to the base stations BS and are monitored and controlled by control devices BSC. The base stations BS are interconnected via a changeover device MSC, which furthermore provides interfaces to other communications systems. Each base station BS synchronizes time slots of radio channels CCH for packet-oriented services with reference to the reference time, said channels being made available via a radio interface between the relevant base station BS and allocated subscriber stations MS. A unique reference is created between the time slots and the reference time, which can be derived by means of a predefined arithmetic rule. The arithmetic rule can be defined, for example, by specifying the time at which a predefined data frame starts. Time slots for the communications channels CCH are thus standardized throughout the entire mobile radio system in terms of the start and duration. Respective independent synchronization is thus possible, even in discrete, isolated radio coverage areas or in the case of base stations which are put into operation in temporal succession.

During transmission via a control channel provided for packet-oriented services within a predefined radio cell, no data are transmitted in the adjacent radio cells via channels which use the same carrier frequencies as the control channel provided for packet-oriented services.

Moreover, for carrier frequencies which communicate with radio channels for connection-oriented services, a higher cell-related frequency repetition factor can be selected than for carrier frequencies which communicate with radio channels for packet-oriented services.

The method according to the invention offers the advantage that subsequently set up base stations, by means of which packet-oriented services are made available, can be independently synchronized with knowledge of the reference time, so that the synchronism condition is automatically fulfilled in converging isolated radio coverage areas of a mobile radio system. Furthermore, existing infrastructure facilities, such as power supply facilities, antenna facilities, racks and clock generators, can be re-used in existing base stations which had hitherto simply managed radio channels for connection-oriented services.

If information concerning the Universal Time Coordinated UTC provided by the Global Positioning System is used, additional GPS receivers are provided in the base stations BS.

According to an alternative advantageous design of the present invention, the information concerning the reference time can be obtained by means of signals emitted by a terrestrial time signal transmitter. If the time signal transmitter is allocated to an atomic clock, the inaccuracy of the information concerning the reference time which is included in the received signal is caused almost entirely by transit time differences, which can be compensated by means of a correction value individually calculated for the respective base station.

The invention claimed is:

1. A method for operating a GSM mobile radio system, comprising:
    managing radio channels for connection-oriented services by base stations;
    providing radio channels for packet-oriented services by predefinable base stations;
    emitting a signal including information concerning a reference time from at least one transmitter, which is allocated to a reference time generator;
    receiving the signal including the information concerning the reference time by the predefinable base stations, which are allocated to radio cells in which packet-oriented services are available; and
    synchronizing time slots of the radio channels for packet-oriented services, in each case independently with reference to the reference time, the radio channels provided for packet-oriented services via a radio interface between the relevant base station and the allocated subscriber stations, wherein for first carrier frequencies which communicate with the radio channels for connection-oriented services, a cell-related frequency repetition factor is selected which is higher than a cell-related frequency repetition factor for second carrier frequencies which communicate with the radio channels for packet-oriented services.

2. The method for operating a GSM mobile radio system as claimed in claim 1, wherein the predefinable base stations from a subset of the base stations.

3. The method for operating a GSM mobile radio system as claimed in claim 2, wherein the signal including the information concerning the reference time is emitted by a satellite allocated to the Global Positioning System.

4. The method for operating a GSM mobile radio system as claimed in claim 2, wherein the signal including the information concerning the reference time is emitted by a terrestrial time signal transmitter allocated to an atomic clock, and transit time differences are compensated by a correction value calculated for the relevant base station.

5. The method for operating a GSM mobile radio system as claimed in claim 2, wherein during transmission via a control channel provided for packet-oriented services within a predefined radio cell, no data are transmitted in the adjacent radio cells via channels which use the same carrier frequencies as the control channel provided for packet-oriented services.

6. The method for operating a GSM mobile radio system as claimed in claim 1, wherein the signal including the information concerning the reference time is emitted by a satellite allocated to the Global Positioning System.

7. The method for operating a GSM mobile radio system as claimed in claim 6, wherein during transmission via a control channel provided for packet-oriented services within a predefined radio cell, no data are transmitted in the adjacent radio cells via channels which use the same carrier frequencies as the control channel provided for packet-oriented services.

8. The method for operating a GSM mobile radio system as claimed in claim 1, wherein the signal including the information concerning the reference time is emitted by a terrestrial time signal transmitter allocated to an atomic clock, and transit time differences are compensated by a correction value calculated for the relevant base station.

9. The method for operating a GSM mobile radio system as claimed in claim 8, wherein during transmission via a control channel provided for packet-oriented services within a predefined radio cell, no data are transmitted in the adjacent radio cells via channels which use the same carrier frequencies as the control channel provided for packet-oriented services.

10. The method for operating a GSM mobile radio system as claimed in claim 1, wherein during transmission via a control channel provided for packet-oriented services within a predefined radio cell, no data are transmitted in the adjacent radio cells via channels which use the same carrier frequencies as the control channel provided for packet-oriented services.

11. The method for operating a GSM mobile radio system as claimed in claim 1, wherein during transmission via a control channel provided for packet-oriented services within a predefined radio cell, no data are transmitted in the adjacent radio cells via channels which use the same carrier frequencies as the control channel provided for packet-oriented services.

12. A method for operating a GSM mobile radio system, comprising:
managing radio channels for connection-oriented services by base stations;
providing radio channels for packet-oriented services by predefinable base stations;
emitting a signal including information concerning a reference time from at least one transmitter, which is allocated to a reference time generator;
receiving the signal including the information concerning the reference time by the predefinable base stations, which are allocated to radio cells in which packet-oriented services are available; and
synchronizing time slots of the radio channels for packet-oriented services, in each case independently with reference to the reference time, the radio channels provided for packet-oriented services via a radio interface between the relevant base station and the allocated subscriber stations, wherein
the predefinable base stations from a subset of the base stations, and
for first carrier frequencies which communicate with the radio channels for connection-oriented services, a cell-related frequency repetition factor is selected which is higher than a cell-related frequency repetition factor for second carrier frequencies which communicate with the radio channels for packet-oriented services.

13. A method for operating a GSM mobile radio system, comprising:
managing radio channels for connection-oriented services by base stations;
providing radio channels for packet-oriented services by predefinable base stations;
emitting a signal including information concerning a reference time from at least one transmitter, which is allocated to a reference time generator;
receiving the signal including the information concerning the reference time by the predefinable base stations, which are allocated to radio cells in which packet-oriented services are available; and
synchronizing time slots of the radio channels for packet-oriented services, in each case independently with reference to the reference time, the radio channels provided for packet-oriented services via a radio interface between the relevant base station and the allocated subscriber stations, wherein
the signal including the information concerning the reference time is emitted by a satellite allocated to the Global Positioning System, and
for first carrier frequencies which communicate with the radio channels for connection-oriented services, a cell-related frequency repetition factor is selected which is higher than a cell-related frequency repetition factor for second carrier frequencies which communicate with the radio channels for packet-oriented services.

14. A method for operating a GSM mobile radio system, comprising:
managing radio channels for connection-oriented services by base stations;
providing radio channels for packet-oriented services by predefinable base stations;
emitting a signal including information concerning a reference time from at least one transmitter, which is allocated to a reference time generator;
receiving the signal including the information concerning the reference time by the predefinable base stations, which are allocated to radio cells in which packet-oriented services are available; and
synchronizing time slots of the radio channels for packet-oriented services, in each case independently with reference to the reference time, the radio channels provided for packet-oriented services via a radio interface between the relevant base station and the allocated subscriber stations, wherein
the signal including the information concerning the reference time is emitted by a terrestrial time signal transmitter allocated to an atomic clock, and transit time differences are compensated by a correction value calculated for the relevant base station, and
for first carrier frequencies which communicate with the radio channels for connection-oriented services, a cell-related frequency repetition factor is selected which is higher than a cell-related frequency repetition factor for second carrier frequencies which communicate with the radio channels for packet-oriented services.

15. A system for operating a GSM mobile radio system, comprising:
radio channels for connection-oriented services managed by base stations;
radio channels for packet-oriented services provided by predefinable base stations;
a signal including information concerning a reference time is emitted from at least one transmitter, which is allocated to a reference time generator, wherein
the signal, including the information concerning the reference time, is received by the predefinable base stations, which are allocated to radio cells in which packet-oriented services are available, and
the base stations synchronize time slots of the radio channels for packet-oriented services, in each case independently with reference to the reference time, and the radio channels are provided for packet-oriented services via a radio interface between the relevant base station and the allocated subscriber stations, wherein
for first carrier frequencies which communicate with the radio channels for connection-oriented services, a cell-related frequency repetition factor is selected which is higher than a cell-related frequency repetition factor for second carrier frequencies which communicate with the radio channels for packet-oriented services.

* * * * *